United States Patent
Kitano

(10) Patent No.: US 7,551,992 B2
(45) Date of Patent: Jun. 23, 2009

(54) DETECTING TIRE DECOMPRESSION BASED ON WHEEL SPEED

(75) Inventor: Masashi Kitano, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 795 days.

(21) Appl. No.: 10/977,440

(22) Filed: Nov. 1, 2004

(65) Prior Publication Data

US 2005/0113992 A1 May 26, 2005

(30) Foreign Application Priority Data

Nov. 25, 2003 (JP) .............................. 2003-393594
Dec. 25, 2003 (JP) .............................. 2003-429576

(51) Int. Cl.
*G01M 17/00* (2006.01)
*G06F 7/00* (2006.01)
*G06F 19/00* (2006.01)

(52) U.S. Cl. ........................... 701/29; 116/34; 137/223; 137/224; 141/38; 200/61.22; 338/37; 340/442; 425/15; 73/146.2; D10/86

(58) Field of Classification Search ................... 701/29; 116/34; 137/223–224; 141/38; 200/61.22; 338/37; 340/442; 425/15; 73/146.2; D10/86
See application file for complete search history.

(56) References Cited

U.S. PATENT DOCUMENTS

| 3,691,524 | A | * | 9/1972 | Frost et al. .................. 340/444 |
| 4,267,575 | A | * | 5/1981 | Bounds ....................... 702/148 |
| 4,566,737 | A | * | 1/1986 | Masaki et al. ............... 303/173 |
| 4,651,281 | A | * | 3/1987 | Masaki et al. ................. 701/79 |
| 4,777,611 | A | * | 10/1988 | Tashiro et al. .............. 702/148 |
| 4,876,528 | A | * | 10/1989 | Walker et al. ............... 340/442 |
| 4,909,074 | A | * | 3/1990 | Gerresheim et al. ........ 73/146.4 |
| 4,943,922 | A | * | 7/1990 | Tanaka ........................ 701/78 |
| 5,006,844 | A | * | 4/1991 | Ohta et al. ................... 340/448 |
| 5,197,008 | A | * | 3/1993 | Itoh et al. ..................... 701/70 |
| 5,218,862 | A | * | 6/1993 | Hurrell et al. .............. 73/146.5 |

(Continued)

FOREIGN PATENT DOCUMENTS

DE 198 02 498 A1 7/1999

(Continued)

*Primary Examiner*—Khoi Tran
*Assistant Examiner*—Jorge O Peche
(74) *Attorney, Agent, or Firm*—Birch, Stewart, Kolasch & Birch, LLP

(57) ABSTRACT

A method for detecting decompression of tires based on the rotational speed of wheels mounted on a vehicle, comprising the steps of: detecting the rotational speed of each of the above-mentioned wheels, determining the speed against ground of the vehicle, calculating the speed information of a fixed wheel from the rotational speeds of said wheels, calculating the judgment value of the wheel position by comparing the speed information of the wheels with the speed against ground of the vehicle, comparing the judgment value of the wheel position with the basis value of the wheel position obtained by preliminarily comparing the speed against ground of the vehicle with the speed information of the wheels at prescribed inner pressure, and judging decompression of tires based on relation between the comparison value of the basis value with the judgment value and a fixed threshold. A region of judging decompression of tires can be broadened and the accuracy of reduced pressure judgment can be improved.

10 Claims, 7 Drawing Sheets

U.S. PATENT DOCUMENTS

| | | | | |
|---|---|---|---|---|
| 5,239,469 | A * | 8/1993 | Walker et al. | 701/29 |
| 5,252,946 | A * | 10/1993 | Walker et al. | 340/444 |
| 5,327,116 | A * | 7/1994 | Davidson | 340/443 |
| 5,327,346 | A * | 7/1994 | Goodell | 701/71 |
| 5,442,331 | A * | 8/1995 | Kishimoto et al. | 340/444 |
| 5,498,072 | A * | 3/1996 | Shimizu | 303/191 |
| 5,564,796 | A * | 10/1996 | Saito et al. | 303/112 |
| 5,646,849 | A * | 7/1997 | Walenty et al. | 701/70 |
| 5,670,716 | A * | 9/1997 | Tamasho et al. | 73/146.2 |
| 5,699,251 | A * | 12/1997 | Mori et al. | 701/97 |
| 5,760,682 | A * | 6/1998 | Liu et al. | 340/444 |
| 5,771,480 | A * | 6/1998 | Yanase | 701/80 |
| 5,826,207 | A * | 10/1998 | Ohashi et al. | 701/36 |
| 5,826,210 | A * | 10/1998 | Izumi et al. | 701/70 |
| 5,895,846 | A * | 4/1999 | Chamussy et al. | 73/146.2 |
| 5,939,626 | A * | 8/1999 | Tominaga et al. | 73/146.2 |
| 5,941,613 | A * | 8/1999 | Tagawa | 303/190 |
| 5,982,279 | A * | 11/1999 | Tominaga et al. | 340/444 |
| 6,034,595 | A * | 3/2000 | Yanase | 340/444 |
| 6,060,983 | A * | 5/2000 | Yanase et al. | 340/444 |
| 6,137,400 | A * | 10/2000 | Yanase et al. | 340/442 |
| 6,182,021 | B1 * | 1/2001 | Izumi et al. | 702/138 |
| 6,317,667 | B1 * | 11/2001 | Oshiro | 701/29 |
| 6,323,765 | B1 * | 11/2001 | Horie et al. | 340/442 |
| 6,339,957 | B1 * | 1/2002 | Yanase et al. | 73/146 |
| 6,385,553 | B1 * | 5/2002 | Naito et al. | 702/138 |
| 6,396,396 | B2 * | 5/2002 | Oshiro et al. | 340/442 |
| 6,420,966 | B2 * | 7/2002 | Sugisawa | 340/442 |
| 6,501,373 | B2 * | 12/2002 | Kitano | 340/444 |
| 6,504,475 | B2 * | 1/2003 | Sugisawa | 340/444 |
| 6,604,040 | B2 * | 8/2003 | Kawasaki et al. | 701/80 |
| 6,615,650 | B2 * | 9/2003 | Mahner | 73/146 |
| 6,696,934 | B2 * | 2/2004 | Sugisawa | 340/442 |
| 6,748,798 | B2 * | 6/2004 | Oshiro et al. | 73/146 |
| 6,768,418 | B2 * | 7/2004 | Tominaga et al. | 340/444 |
| 6,834,543 | B2 * | 12/2004 | Kin et al. | 73/146 |
| 6,940,399 | B2 * | 9/2005 | Tominaga et al. | 340/444 |
| 2002/0036567 | A1 * | 3/2002 | Larson | 340/442 |
| 2002/0053971 | A1 * | 5/2002 | Kitano | 340/442 |
| 2002/0105419 | A1 * | 8/2002 | Sugisawa | 340/442 |
| 2003/0076223 | A1 * | 4/2003 | Tominaga et al. | 340/443 |
| 2003/0130773 | A1 * | 7/2003 | Oshiro et al. | 701/29 |
| 2003/0146830 | A1 * | 8/2003 | Tominaga et al. | 340/444 |
| 2004/0046648 | A1 * | 3/2004 | Matsuura | 340/442 |
| 2004/0079145 | A1 * | 4/2004 | Kin et al. | 73/146 |
| 2004/0196149 | A1 * | 10/2004 | Dufournier | 340/443 |

FOREIGN PATENT DOCUMENTS

| | | | |
|---|---|---|---|
| JP | 51-56273 | | 5/1976 |
| JP | 2-106415 | A | 4/1990 |
| JP | 7-52620 | A | 2/1995 |
| JP | 7-144519 | A | 6/1995 |
| JP | 10-258618 | A | 9/1998 |
| JP | 10-297228 | A | 11/1998 |
| JP | 10-512515 | A | 12/1998 |
| JP | 11-295190 | A | 10/1999 |
| JP | 2002-2240 | A | 1/2002 |
| JP | 2002-2240 | A | 1/2002 |
| JP | 2000185217 | * | 8/2002 |
| JP | 2002-362117 | A | 12/2002 |
| JP | 2003-94920 | A | 4/2003 |
| JP | 2003-146037 | A | 5/2003 |

* cited by examiner

DETECTING TIRE DECOMPRESSION BASED ON WHEEL SPEED

This Nonprofitional application claims priority under 35 U.S.C. § 119(a) on Patent Application No(s). 2003-393594 & 2003-429576 filed in JAPAN on Nov. 25, 2003 & Dec. 25, 2003; respectively, the entire contents of which are hereby incorporated by reference.

BACKGROUND OF THE INVENTION

The present invention relates to a method for detecting decompression of tires and a device thereof, and a program for judging decompression of tires. More specifically, the present invention relates to a method for detecting decompression of tires which can broaden a region of judging decompression of tires and improve the accuracy of reduced pressure judgment and a device thereof, and a program for judging decompression of tires.

A conventional device for detecting decompression of tires uses a principle that since the outer diameter of a tire (the effective rolling radius of a tire) is reduced more than that of a tire having a prescribed inner pressure (normal air pressure) when the pressure of a tire is reduced, wheel speed (rotational angular velocity) is increased as compared with other normal tires. For example, a method of detecting the lowering of an inner pressure from the relative difference of the wheel speed of a tire uses as a judgment value;

$$DEL=\{(V1+V4)/2-(V2+V3)/2\}/\{(V1+V2+V3+V4)/4\}\times 100(\%)$$

(For example, Japanese Unexamined Patent Publication No. 305011/1988).

Wherein V1 to V4 are the wheel speeds of a front left tire, a front right tire, a rear left tire and a rear right tire, respectively.

Further, as an alternative device for detecting decompression of tires, there is a device judging decompression of tires by comparing the wheel speeds of respective tires with the speed against ground of a vehicle which can be measured by GPS (Global Positioning System) and time (Japanese Unexamined Patent Publication No. 146037/2003).

However, since the above-mentioned method compares the wheel speeds on a pair of diagonals relatively, it cannot judge the simultaneous decompression of two front wheel tires or the simultaneous decompression of two rear wheel tires, and further the simultaneous decompression of whole wheel tires. Accordingly, there are problems that continuous drive without knowing decompression causes the deterioration of mileage caused by the increase of rolling resistance of tires, and further causes burst of a tire.

Further, drive wheels generate slip in accordance with drive. More driving force on the road surface of a slope with gradient than on a flat road is specifically required, and slip quantity is increased in proportional to the driving force. Since slip in drive wheels is generated on a steep slope and the like, reduced pressure judgment cannot be accurately carried out, and it is occasionally judged to be reduced pressure nevertheless the tire is prescribed inner pressure. Further, when a vehicle runs on the road surface of a slope, load distribution to front and rear tires is changed, and when the load of wheels is enlarged, the effective rolling radii of tires are lessened, therefore it is occasionally judged to be reduced pressure nevertheless the tires are the prescribed inner pressure.

Further, since the effective rolling radii of tires are changed by centrifugal force, lateral acceleration and the like other than the gradient of a slope as factors affecting a vehicle, it is occasionally judged to be reduced pressure nevertheless the tires are the prescribed inner pressure.

Accordingly, it is difficult to improve the accuracy of reduced pressure judgment only by comparison of the wheel speeds of respective tires and only by comparison of the wheel speeds with the speed against ground of a vehicle.

SUMMARY OF THE INVENTION

Under the above-described circumstances, an object of the present invention is to provide a method for detecting decompression of tires which can broaden a region of judging decompression of tires and improve the accuracy of reduced pressure judgment and a device thereof, and a program for judging decompression of tires.

The method for detecting decompression of tires of the present invention is characterized in a method for detecting decompression of tires based on the rotational speed of wheels mounted on a vehicle, comprising steps of: detecting the rotational speed of each of the above-mentioned wheels, determining the speed against ground of the above-mentioned vehicle, calculating the speed information of a fixed wheel from the rotational speeds of said wheels, memorizing the rotational speed of each of the wheels and the speed information of the above-mentioned wheels, calculating the judgment value of said wheel position by comparing the speed information of the above-mentioned wheels with the speed against ground of the vehicle, comparing the judgment value of the above-mentioned wheel position with the basis value of the wheel position obtained by preliminarily comparing the speed against ground of the vehicle with the speed information of the above-mentioned wheels at prescribed inner pressure, and judging decompression of tires based on relation between the comparison value of the basis value with the judgment value and a fixed threshold.

Further, the method for detecting decompression of tires of the present invention is preferably a method for detecting decompression of tires wherein the speed against ground of the above-mentioned vehicle is determined by signals demodulated from received radio wave of GPS and time.

The device for detecting decompression of tires of the present invention is characterized by comprising: a wheel rotational speed-detecting means for detecting the rotational speed of each of the above-mentioned wheels, a speed against ground of the vehicle-calculating means for determining the speed against ground of the vehicle, a speed information-calculating means for calculating the speed information of a fixed wheel from the rotational speeds of said wheels, a memory means for memorizing the rotational speed of each of the wheels and the speed information of the above-mentioned wheels, a judgment value-calculating means for calculating the judgment value of said wheel position by comparing the speed information of the above-mentioned wheels with the speed against ground of the vehicle, a comparison means for comparing the judgment value of the above-mentioned wheel position with the basis value of the wheel position obtained by preliminarily comparing the speed against ground of the vehicle with the speed information of the above-mentioned wheels at prescribed inner pressure, and a reduced pressure-judging means for judging decompression of tires based on relation between the comparison value of said basis value with the judgment value and a fixed threshold.

The program for judging decompression of tires of the present invention is characterized by comprising: a speed information-calculating means for calculating the speed information of a fixed wheel from the rotational speeds of said wheel, a memory means for memorizing the rotational speed of each of the wheels and the speed information of the above-mentioned wheels, a judgment value-calculating means for calculating the judgment value of said wheel position by comparing the speed information of the above-mentioned wheels with the speed against ground of the vehicle, a comparison means for comparing the judgment value of the above-mentioned wheel position with the basis value of the wheel position obtained by preliminarily comparing the speed against ground of the vehicle with the speed information of the above-mentioned wheels at prescribed inner pressure, and a decompression-judging means for judging decompression of tires based on relation between the comparison value of said basis value with the judgment value and a fixed threshold, in order to judge decompression of tires based on the rotational speeds of wheels mounted on a vehicle.

Further, the method for detecting decompression of tires based on the rotational speeds of wheels mounted on a vehicle, comprising steps of: detecting the rotational speed of each of the above-mentioned wheels, determining the speed against ground of the above-mentioned vehicle, determining a relational value between the wheel speeds calculated from the rotational speeds of the above-mentioned wheels and the speed against ground of the above-mentioned vehicle, determining a correlation between said relational value and information value related to the vehicle, comparing said correlation with the above-mentioned correlation at prescribed inner pressure, and judging decompression of tires based on the result of said comparison.

Further, the method for detecting decompression of tires of the present invention is preferably a method for detecting decompression of tires wherein the information value related to the above-mentioned vehicle is sine of gradient of running road surface, speed against ground of the vehicle, back-and-forth acceleration, lateral acceleration or a turning radius.

Further, the method for detecting decompression of tires based on the rotational speeds of wheels mounted on a vehicle is characterized by comprising steps of: detecting the rotational speed of each of the above-mentioned wheels, determining the relational value of the wheel speeds calculated from the rotational speeds of the above-mentioned wheels, determining a correlation between said relational value and information value related to the vehicle, comparing said correlation with the above-mentioned correlation at prescribed inner pressure, and judging decompression of tires based on the result of said comparison.

Further, the method for detecting decompression of tires of the present invention is preferably a method for detecting decompression of tires wherein the relational value of the speeds of the above-mentioned wheels is the correlative value of the speeds of wheels on a pair of diagonals of a vehicle, the ratio of the speed of wheels at a front axle to that at a rear axle, or difference between them, or the ratio of the speed of left front and rear wheels to that of right front and rear wheels, or difference between them.

The device for detecting decompression of tires of the present invention is characterized by comprising: a wheel speed-detecting means for detecting the rotational speed of each of the above-mentioned wheels, a speed against ground of the vehicle-calculating means for determining the speed against ground of the vehicle, a relational value-calculating means for determining a relational value between the speeds of wheels calculated from the rotational speeds of the above-mentioned wheels and the speed against ground of the above-mentioned vehicle, a correlation-calculating means for determining a correlation between said relational value and information value related to the vehicle, a comparison means for comparing said correlation with the above-mentioned correlation at prescribed inner pressure, and a reduced pressure-judging means for judging decompression of tires based on the result of said comparison.

The device for detecting decompression of tires of the present invention is characterized by comprising: a wheel speed-detecting means for detecting the rotational speed of each of the above-mentioned wheels, a relational value-calculating means for determining the relational value of the speeds of wheels calculated from the rotational speeds of the above-mentioned wheels, a correlation-calculating means for determining a correlation between said relational value and information value related to the vehicle, a comparison means for comparing said correlation with the above-mentioned correlation at prescribed inner pressure, and a decompression-judging means for judging decompression of tires based on the result of said comparison.

The program for judging decompression of tires of the present invention is characterized by comprising: a relational value-calculating means for determining the relational value of the speeds of wheels calculated from the rotational speeds of the above-mentioned wheels and the speed against ground of the vehicle determined, a correlation-calculating means for determining a correlation between said relational value and information value related to the vehicle, a comparison means for comparing said correlation with the above-mentioned correlation at prescribed inner pressure, and a reduced pressure-judging means for judging decompression of tires based on the result of the comparison, in order to judge decompression of tires based on the rotational speeds of wheels mounted on a vehicle.

The program for judging decompression of tires of the present invention is characterized by comprising: a relational value-calculating means for determining the relational value of the speeds of wheels calculated from the rotational speeds of the above-mentioned wheels, a correlation-calculating means for determining a correlation between said relational value and the information value related to the vehicle, a comparison means for comparing said correlation with the above-mentioned correlation at prescribed inner pressure, and a reduced pressure-judging means for judging decompression of tires based on the result of said comparison, in order to judge decompression of tires based on the rotational speeds of wheels mounted on a vehicle.

The decompression of tire by puncture causes a reduction in air pressure of one wheel tire of the vehicle in many cases. But the air pressure of tire is reduced slowly without failure of the tire. Besides decompression of tire by growth of size of new tire or low temperature, the air pressure of tire is reduced by filtering air through rubber of tire. In those cases the air pressure of whole tires mounted on a vehicle are simultaneously reduced, and the decompression can not be found by the driver.

According to the present invention, the simultaneous (same rate) decompression of a plural number of wheels (left wheel tires, right wheel tires, wheel tires at a diagonal position, four wheel tires and the like) as well as the decompression of one wheel tire can be detected. It can be informed that the plural number of tires are decompressed, and it save the mileage of the vehicle and can avoid danger of the burst of tires in high speed driving. Referring to Example 1 described later, in the case of a FF car, the judgment value of the wheel position (the average wheel speed of the left and right two wheel tires at the same side/the speed against ground of the vehicle) was 0.02004 where the four wheel tires were reduced by 20%. The change rates at a reduced pressure of 20% from the basis value are 0.2% for both of the left and right two wheel tires at the same side. It is less than a threshold set as 0.3% and it was not judged as the reduced pressure. To the contrary, the judgment value of the wheel position at a reduced pressure of 40% was 0.02008, the change rates at that time from the basis value are 0.4% for both of the left and right two wheel tires at the same side. Accordingly, since it was judged as the reduced pressure at both of left and right sides, the decompression of four wheel tires were alarmed.

Further, according to the present invention, in addition to relational value between wheel speed and vehicle speed against ground of the vehicle, using a correlation between the relational value and factors related to the vehicle, the decompression of tires is judged by comparing said correlation with the above-mentioned correlation at the prescribed inner pressure. The accuracy of reduced pressure judgment can be improved. For example, the sine of gradient of running road surface, the speed against ground of the vehicle, back-and-forth acceleration, lateral acceleration or a turning radius and the like can be used as factors related to a vehicle. Referring to Example 5 described later, in the case of a FF car, a relational equation which represents the relational value between the wheel speed and the speed against ground of a vehicle and the sine of gradient with the primary equation was determined using the sine of the gradient of running road surface as the information value related to a vehicle. The values of the y-section are 0.2611 and 0.2624 from the relational equations in condition in which pressure was reduced by 20% and 40% than the prescribed pressure, and the differences from the prescribed pressure condition are 0.0006 and 0.0019. The differences are respectively equivalent to change rates of 0.2% and 0.7%. Therefore, it can be informed accurately that the tire is not decompressed at 20% reduction, and that the tires are decompressed at 40% reduction.

DETAILED DESCRIPTION

The method for detecting decompression of tires of the present invention and a device thereof, and a program for judging decompression of tires are illustrated below based on the attached drawings.

Figure 1:
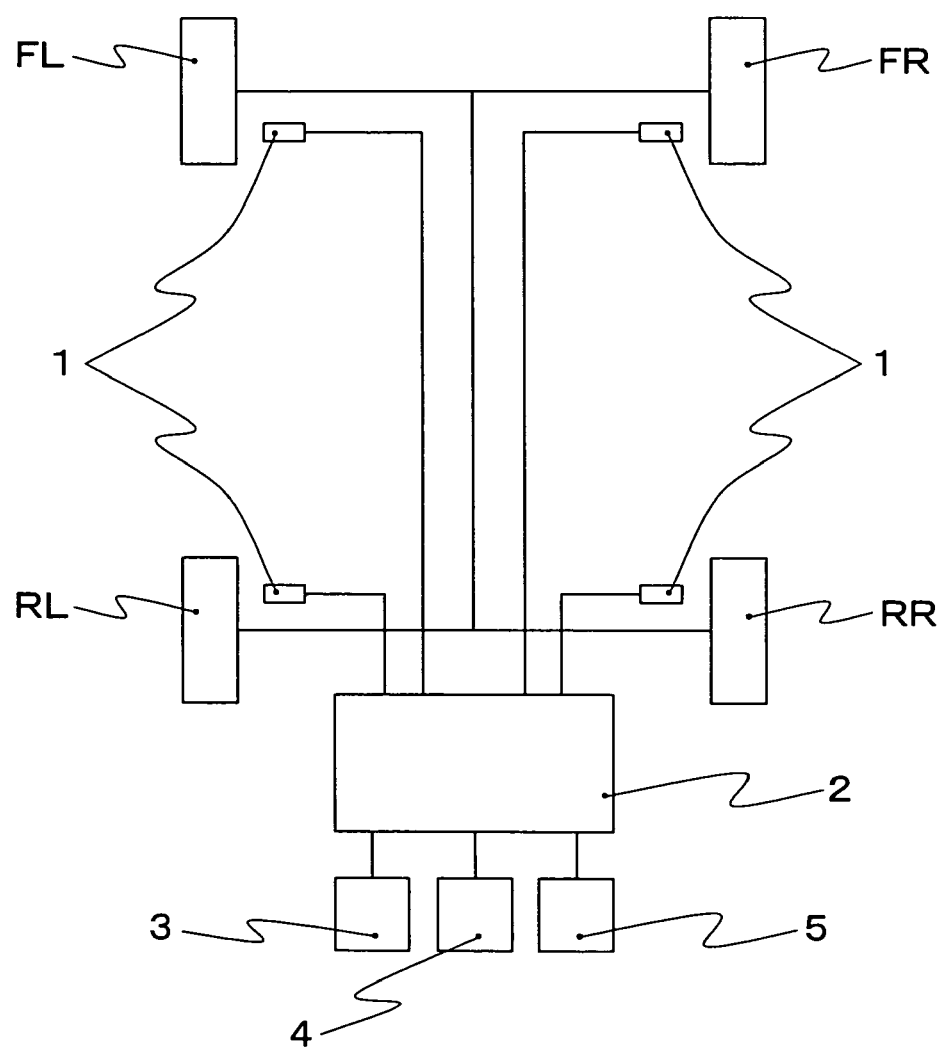
FIG. 1 is a block diagram showing the detection device for detecting decompression of tires related to Embodiment 1 of the present invention.

As shown in FIG. 1, the detection device for detecting decompression of tires related to Embodiment 1 of the present invention detects whether the air pressures of four tires, FL, FR, RL and RR which were provided on a vehicle are lowered or not, and is equipped with a usual wheel speed-detecting means 1 which were provided being respectively related with tires.

As the above-mentioned wheel speed-detecting means 1, a wheel speed sensor for generating rotary pulses using an electromagnetic pickup and the like and measuring a rotational angular velocity and wheel speeds from the number of pulses, or an angular velocity sensor including those for generating power utilizing rotation such as a dynamo and measuring a rotational angular velocity and wheel speeds from the voltage, or the like can be used. The output of the above-mentioned wheel speed-detecting means 1 is provided to the control unit 2 which is a computer such as ABS. A display 3 which is constituted by a liquid crystal display, a plasma display device or a CRT for informing a tire whose air pressure was lowered, an initialization switch 4 which can be operated by a driver, and an alarming device 5 are connected with the control unit 2.

Figure 2:
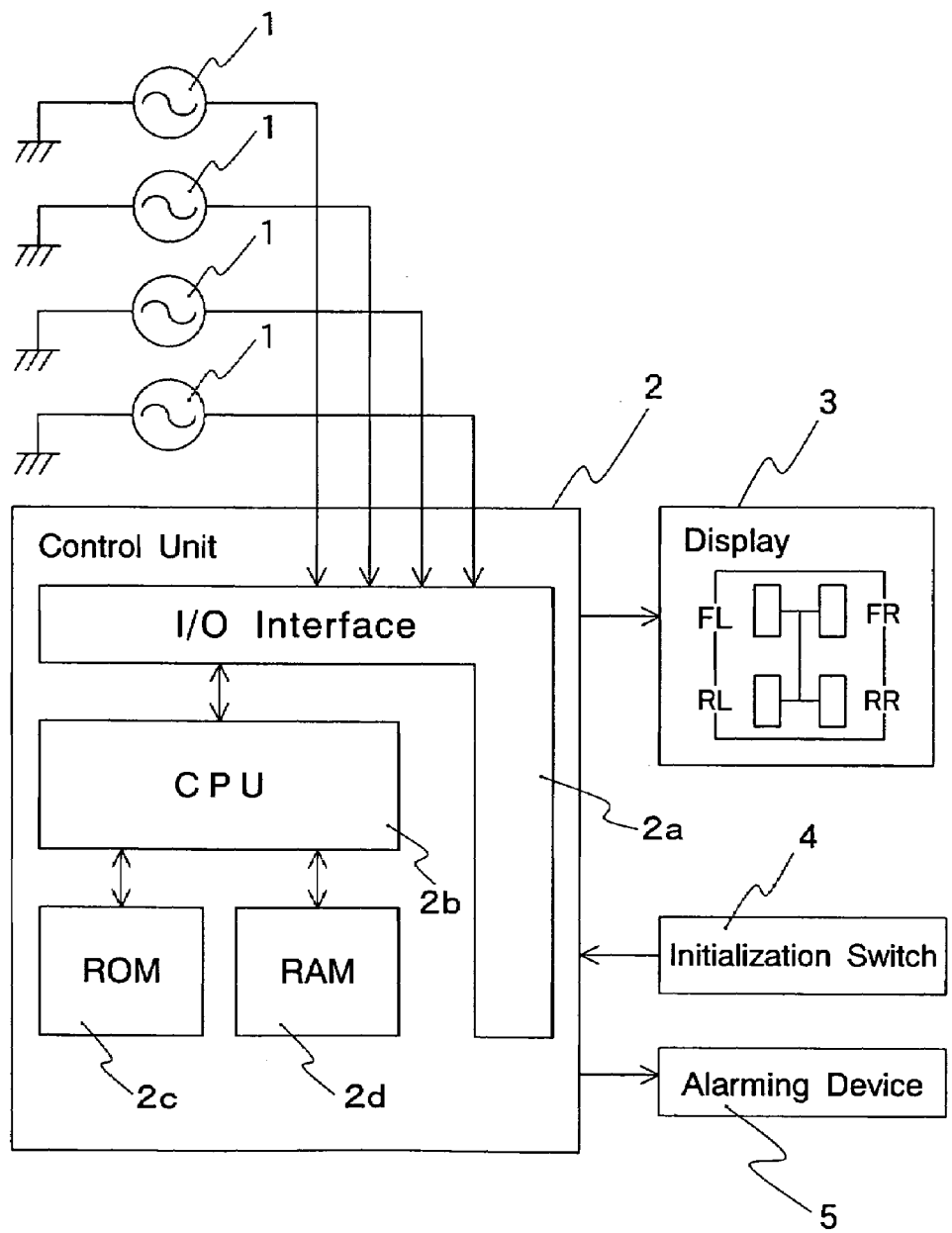
FIG. 2 is a block diagram showing the electric composition of the detection device for detecting decompression of tires of FIG. 1.

As shown in FIG. 2, the above-mentioned control unit 2 is composed of an I/O interface 2a which is necessary for transferring signals with external devices, a CPU 2b functioning as the center of processing, a ROM 2c in which the control operation program of CPU 2b was stored, and a RAM 2d in which data are temporarily downloaded and the downloaded data and the like are read out when the above-mentioned CPU 2b carries out control operation.

The above-mentioned wheel speed-detecting means 1 outputs pulse signals (hereinafter, referred to as wheel speed pulses) corresponding to the rotation numbers of tires. Further, CPU 2b calculates the rotational angular velocities, Fi, of the respective tires by every fixed sampling cycle, $\Delta T$ (sec), for example, by every $\Delta T=1$ second, based on the wheel speed pulses which were output from the wheel speed-detecting means 1.

By the way, since tires are produced including unevenness (initial difference) within specification, the effective rolling radii (a value obtained by dividing a distance proceeded by one rotation, by $2\pi$) of respective tires are not always the same even if all tires have normal air pressure. Accordingly, the rotational angular velocities, Fi of respective tires come to be uneven. Therefore, for example, there is a method of excluding the influence of initial difference from the rotational angular velocities, Fi. Firstly, the method calculates initial correction coefficients K1, K2 and K3 which are shown as follow.

$$K1 = F1/F2 \tag{1}$$

$$K2 = F3/F4 \tag{2}$$

$$K3 = (F1 + K1 \times F2)/(F2 + K2 \times F4) \tag{3}$$

Subsequently, new rotational angular velocities, $F1_i$ are determined using the initial correction coefficients K1, K2 and K3 which were thus calculated, as shown in the equations (4) to (7).

$$F1_1 = F1 \tag{4}$$

$$F1_2 = K1 \times F2 \tag{5}$$

$$F1_3 = K3 \times F3 \tag{6}$$

$$F1_4 = K2 \times K3 \times F4 \tag{7}$$

Herein, the initial correction coefficient, K1, is a coefficient for correcting the difference of effective rolling radius which is caused by the initial difference between left and right front tires. The initial correction coefficient, K2, is a coefficient for correcting the difference of effective rolling radius caused by the initial difference between left and right rear tires. The initial correction coefficient, K3, is a coefficient for correcting the difference of effective rolling radius caused by the initial difference between a left front tire and a left rear tire. Then, the wheel speed of a tire of each of wheels, Vi is calculated based on the above-mentioned $F1_i$.

Embodiment 1

Embodiment 1 is composed of a wheel speed-detecting means 1, a speed against ground of a vehicle-calculating means, or ground speed calculating means, for determining the speed against ground of the vehicle, a speed information-calculating means of calculating the speed information of a particular wheel from the speeds of the wheels, a memory means for memorizing the wheel speed of each of the wheels and the speed information of the above-mentioned wheels, a judgment value-calculating means of calculating the judgment value of the wheel position by comparing the above-mentioned speed information of the wheels with the ground speed of the vehicle, a comparison means for comparing the judgment value of the above-mentioned wheel position with the basis value of the wheel position obtained by preliminarily comparing the above-mentioned ground speed of the vehicle with the speed information of the above-mentioned wheels at the prescribed inner pressure to obtain a comparison value, and a reduced pressure-judging means for judging decompression of tires based on a relation between the comparison value and a fixed threshold.

In Embodiment 1, the calculation of the basis value at the prescribed inner pressure is started pushing an initialization button which is operated for preliminarily initializing.

The speed against ground of the above-mentioned vehicle includes a speed against ground of a vehicle which can be determined by signals demodulated from received radio wave of GPS (Global Positioning System) and time, a speed against ground of a vehicle which can be determined by a sensor buried in road surface and passing time, and the like. When the above-mentioned GPS is used, a vehicle is equipped with a transmitter and a receiver, for example, a GPS device such as a car navigation device using a GPS antenna. The device stores internally a speed against ground of a vehicle-calculating means which receives electric wave from a GPS satellite to measure its self position and then, calculates the speed against ground of a vehicle.

As the above-mentioned car navigation device, for example, there can be used a device which detects its running position utilizing the antenna of GPS (Global Positioning System), inputs its surrounding map data into the main body of car navigator from CD-ROM and the like, displays its geographical information on a display panel and the like by a routine process of displaying the map, receives road information from external transmitters such as beacons provided on a road and FM transmitter through beacon antennas, and additionally displays the road information on a display panel and the like by a routine process of display of the main body of a car navigator.

Example of the comparison of the above-mentioned speed information of wheels and the speed against ground of a vehicle, V and the judgment value I of the wheel position includes those which are shown as follow. Further, as the comparison, mutual ratio or their difference can be used.

(1) Where the speed information of wheels is an average wheel speed of both left wheels or both right wheels (two wheels at the same side), (i) I={(left/right wheel speeds at front axle+left/right wheel speeds at rear axle)/2}/V (ii) I={(left/right wheel speeds at front axle+left/right wheel speeds at rear axle)/2}−V (2) Where the speed information of wheels is an average wheel speed of the front two wheel tires or the rear two wheel tires, (i) I={(left wheel speeds at front/rear axle+right wheel speeds at front/rear axes)/2}/V (ii) I={(left/right wheel speeds at front axle+left/right wheel speeds at rear axes)/2}−V (3) Where the speed information of wheels is an average wheel speed of wheel tires on a diagonal and an average wheel speed of wheel tires on another diagonal, (i) I=[{(V2+V3)/2}/V]/[{(V1+V4)/2}/V]

(ii) I=[{(V2+V3)/2}/V]−[{(V1+V4)/2}/V]

(4) Where the speed information of wheels is an average wheel speed of four wheel tires, (i) I={(V1+V2+V3+V4)/4}/V (ii) I={(V1+V2+V3+V4)/4}−V (5) Where the speed information of wheels is the wheel speed, Vi (i=1 to 4) of each of wheel tires, (i) I=Vi/V (ii) I=Vi−V In Embodiment 1, when the difference (comparison value) between the judgment value, I of the above-mentioned wheel position and the basis value of said wheel position which was measured at the prescribed inner pressure is larger than a preliminarily determined threshold, it is judged to be decompression. Thus, when the above-mentioned item (1) is used, the decompression of the left and right two wheel tires at the same side and the simultaneous decompression of four wheel tires can be judged. Further, when the above-mentioned item (2) is used, the decompression of the two wheel tires at the same axle and the simultaneous decompression of four wheel tires can be judged. Further, when the above-mentioned items (3) to (5) are used, the decompression of a plural number of wheel tires, for example, the simultaneous decompression of four wheel tires can be judged as well as the reduced pressure of one wheel tire.

Then, the invention is illustrated based on Examples, but the invention is not limited only to these Examples.

EXAMPLE 1

As a vehicle, a vehicle with front axle drive was prepared. After pushing an initialization button under tires with the preliminarily prescribed inner pressure, straight equal speed running was carried out at 40 km/h on road surface to start the calculation of the basis value. In the present Example, the basis value of a wheel position which was measured at the preliminarily prescribed inner pressure (the average wheel speed of left or right two wheel tires at the same side/the speed against ground of the vehicle) was calculated as shown in Table 1 using the average wheel speed of the left and right two wheel tires at the same side as the speed information of wheels.

TABLE 1

|  | Left Side | Right Side |
|---|---|---|
| Basis Value | 0.020 | 0.020 |

Then, the above-mentioned running test was carried out by reducing the air pressures of four wheel tires by 20%. The judgment value of the wheel position at this time was 0.02004 as shown in Table 2.

TABLE 2

|  | Left Side | Right Side |
|---|---|---|
| Judgment Value | 0.02004 | 0.02004 |

Then, the above-mentioned running test was carried out by reducing the air pressures of four wheel tires by 40%. The judgment value of the wheel position at this time was 0.02008 as shown in Table 3.

TABLE 3

|  | Left Side | Right Side |
|---|---|---|
| Judgment Value | 0.02008 | 0.02008 |

In the present Example, when a threshold for detecting a reduced pressure of 30% or more from the prescribed inner pressure is set as 0.3%, the basis value at the prescribed inner pressure is 0.02 as shown in Table 1; therefore the change rates at a reduced pressure of 20% from the basis value are 0.2% for both of the left and right two wheel tires at the same side as shown in Table 4. Accordingly, when the change of 0.2% is compared with the above-mentioned threshold of 0.3%, the threshold is larger than the change, therefore it was not judged as the reduced pressure.

TABLE 4

|  | Left Side | Right Side |
|---|---|---|
| Change Rate | 0.2% | 0.2% |

To the contrary, the change rates at a reduced pressure of 40% from the basis value are 0.4% for both of the left and right two wheel tires at the same side as shown in Table 5. Accordingly, when the change of 0.4% is compared with the above-mentioned threshold of 0.3%, the threshold is smaller than the change, therefore since it was judged as the reduced pressure at both of left and right sides, the decompression of four wheel tires were alarmed.

TABLE 5

|  | Left Side | Right Side |
|---|---|---|
| Change Rate | 0.4% | 0.4% |

Further, in the present Example, a running test when the pressures of the left and right two wheel tires at the same side were simultaneously reduced was carried out, but it can be also judged that the pressures of two wheel tires at the same side (left side or right side) are simultaneously reduced, by carrying out a running test when the pressures of two wheel tires at the left side or two wheel tires at the right side are simultaneously reduced.

EXAMPLE 2

As a vehicle, a vehicle with front axle drive was prepared. After pushing an initialization button under tires with preliminarily prescribed inner pressure, straight equal speed running was carried out at 40 km/h on road surface to start the calculation of the basis value. In the present Example, the basis values of wheel positions of a front axle and a rear axle which were measured at the preliminarily prescribed inner pressure (the average wheel speed of front two wheel tires/the speed against ground of the vehicle) and (the average wheel speed of rear two wheel tires/the speed against ground of the vehicle) were calculated as shown in Table 6 using the average wheel speed of the front two wheel tires or the rear two wheel tires as the speed information of wheels.

TABLE 6

| Basis Value | Front Axle | 0.020 |
|---|---|---|
|  | Rear Axle | 0.015 |

Then, the above-mentioned running test was carried out by reducing the air pressures of four wheel tires by 20%. The judgment values of the wheel positions at the front axle and the rear axle at this time were respectively 0.02004 and 0.01504 as shown in Table 7.

TABLE 7

| Judgment Value | Front Axle | 0.02004 |
|---|---|---|
|  | Rear Axle | 0.01504 |

Then, the above-mentioned running test was carried out by reducing the air pressures of four wheel tires by 40%. The judgment values of the wheel positions at the front axle and the rear axle at this time were respectively 0.02008 and 0.01508 as shown in Table 8.

TABLE 8

| Judgment Value | Front Axle | 0.02008 |
|---|---|---|
|  | Rear Axle | 0.01508 |

In the present Example, when a threshold for detecting a reduced pressure of 30% or more from the prescribed inner pressure is set as 0.3%, the basis values of the front axle and the rear axle at the prescribed inner pressure are 0.020 and 0.015 as shown in Table 6; therefore the change rates at a reduced pressure of 20% from the basis values of the front axle and the rear axle are 0.2% for two wheel tires at the front axle and 0.27% from two wheel tires at the rear axle as shown in Table 9. Accordingly, when these changes are compared with the above-mentioned threshold of 0.3%, the threshold is larger than the changes, therefore, it was not judged as the reduced pressure.

TABLE 9

| Change Rate | Front Axle | 0.2% |
|---|---|---|
|  | Rear Axle | 0.27% |

To the contrary, the change rates from the basis values of the front axle and the rear axle at a reduced pressure of 40% are 0.4% for the two wheel tires at the front axle and 0.54% for the two wheel tires at the rear axle as shown in Table 10. Accordingly, when the changes are compared with the above-mentioned threshold of 0.3%, the threshold is smaller than the changes, therefore since it was judged as the reduced pressure at both of the two wheel tires at the front axle and the rear axle, the decompression of four wheel tires were alarmed.

TABLE 10

| Change Rate | Front Axle | 0.4% |
|---|---|---|
| | Rear Axle | 0.54% |

Further, in the present Example, a running test when the pressures of the two wheel tires at the front axle and the rear axle were simultaneously reduced was carried out, but it can be also judged that the pressures of the two wheel tires at the front axle or the rear axle are simultaneously reduced, by carrying out a running test when the pressures of the two wheel tires at the front axle or the two wheel tires at the rear axle are simultaneously reduced.

EXAMPLE 3

As a vehicle, a vehicle with front axle drive was prepared. After pushing an initialization button under tires with preliminarily prescribed inner pressure, straight equal speed running was carried out at 40 km/h on road surface to start the calculation of the basis value. In the present Example, the basis value of wheel positions which were measured at the preliminarily prescribed inner pressure (the average wheel speed of four wheel tires/the speed against ground of the vehicle) was 0.02 using the average wheel speed of the four wheel tires as the speed information of wheels.

Then, the above-mentioned running test was carried out by reducing the air pressures of four wheel tires by 20%. The judgment value of the wheel positions at this time was 0.02004.

Then, the above-mentioned running test was carried out by reducing the air pressures of four wheel tires by 40%. The judgment value of the wheel positions at this time was 0.02008.

In the present Example, when a threshold for detecting a reduced pressure of 30% or more from the prescribed inner pressure is set as 0.3%, the basis value at the prescribed inner pressure is 0.02; therefore the change rate at a reduced pressure of 20% from the basis value is 0.2%. Accordingly, when the change of 0.2% is compared with the above-mentioned threshold of 0.3%, the threshold is larger than the change; therefore it was not judged as the reduced pressure.

To the contrary, the change rate from the basis value at a reduced pressure of 40% is 0.4%. Accordingly, when the change of 0.4% is compared with the above-mentioned threshold of 0.3%, the threshold is smaller than the change; therefore the decompression of four wheel tires were alarmed.

Further, in the present Example, a running test when the pressures of the four wheel tires were simultaneously reduced was carried out, but it was grasped that the reduced pressure can be also similarly judged with respect to one wheel tire (for example, a left front tire) and two wheel tires (for example, two wheel tires at the front axle, and two left wheel tires at the same side).

EXAMPLE 4

As a vehicle, a vehicle with front axle drive was prepared. After pushing an initialization button under tires with preliminarily prescribed inner pressure, straight equal speed running was carried out at 40 km/h on road surface to start the calculation of the basis value. In the present Example, the basis values of wheel positions of respective wheel tires which were measured at the preliminarily prescribed inner pressure (the respective wheel speeds/the speed against ground of the vehicle) was calculated as shown in Table 11 using the wheel speeds of the respective wheel tires, as the speed information of wheels.

TABLE 11

| Basis Value | Left Side | Right Side |
|---|---|---|
| Front Axle | 0.020 | 0.020 |
| Rear Axle | 0.015 | 0.015 |

Then, the above-mentioned running test was carried out by reducing the air pressures of four wheel tires by 20%. The judgment values of the wheel positions of the respective wheel tires were respectively calculated as shown in Table 12.

TABLE 12

| Judgment Value | Left Side | Right Side |
|---|---|---|
| Front Axle | 0.02004 | 0.02004 |
| Rear Axle | 0.01504 | 0.01504 |

Then, the above-mentioned running test was carried out by reducing the air pressures of four wheel tires by 40%. The judgment values of the wheel positions at the front axle and the rear axle at this time were respectively calculated as shown in Table 13.

TABLE 13

| Judgment Value | Left Side | Right Side |
|---|---|---|
| Front Axle | 0.02008 | 0.02008 |
| Rear Axle | 0.01508 | 0.01508 |

In the present Example, when a threshold for detecting a reduced pressure of 30% or more from the prescribed inner pressure is set as 0.3%, the basis values of the respective wheel tires at the prescribed inner pressure are 0.020 for the front axle and 0.015 for the rear axle as shown in Table 1; therefore the change rates at a reduced pressure of 20% from the basis values of the front axle and the rear axle are 0.2% for two wheel tires at the front axle and 0.27% for two wheel tires at the rear axle as shown in Table 14. Accordingly, when these changes are compared with the above-mentioned threshold of 0.3%, the threshold is larger than the changes, therefore it was not judged as the reduced pressure.

TABLE 14

| Change Rate | Left Side | Right Side |
|---|---|---|
| Front Axle | 0.2% | 0.2% |
| Rear Axle | 0.27% | 0.27% |

To the contrary, the change rates from the basis values of the front axle and the rear axle of the respective wheel tires at a reduced pressure of 40% are 0.4% for the two wheel tires at the front axle and 0.54% for the two wheel tires at the rear axle as shown in Table 15. Accordingly, when these changes are compared with the above-mentioned threshold of 0.3%, the threshold is smaller than the changes; therefore since it was judged as the reduced pressure at the respective wheel tires, the decompression of four wheel tires were alarmed.

TABLE 15

| Change Rate | Left Side | Right Side |
| --- | --- | --- |
| Front Axle | 0.4% | 0.4% |
| Rear Axle | 0.54% | 0.54% |

Further, in the present Example, a running test when the pressures of the respective wheel tires were simultaneously reduced was carried out, but the reduced pressure of one wheel tire and the decompression of a plural number of wheel tires can be also judged.

For example, the judgment values of wheel positions at the front axle and the rear axle when the pressure of only the left front tire (one wheel tire) was reduced by 40% were respectively calculated as shown in Table 16.

TABLE 16

| Judgment Value | Left Side | Right Side |
| --- | --- | --- |
| Front Axle | 0.02008 | 0.02000 |
| Rear Axle | 0.01500 | 0.01500 |

The change rates from the basis values of the front axle and the rear axle of the respective wheel tires are 0.40% for the left front wheel tire and 0.00% for the residual tires as shown in Table 17. Accordingly, when these changes are compared with the above-mentioned threshold of 0.3%, the threshold is smaller than the changes; therefore since it was judged as the reduced pressure at the left front wheel tire, the reduced pressure of the left front wheel tire was alarmed.

TABLE 17

| Change Rate | Left Side | Right Side |
| --- | --- | --- |
| Front Axle | 0.40% | 0.00% |
| Rear Axle | 0.00% | 0.00% |

Further, when the pressure of only the two wheel tires at the front axle was reduced by 40%, the judgment values of wheel positions at the front axle and the rear axle were respectively calculated as shown in Table 18.

TABLE 18

| Judgment Value | Left Side | Right Side |
| --- | --- | --- |
| Front Axle | 0.02008 | 0.02008 |
| Rear Axle | 0.01500 | 0.01500 |

The change rates from the basis values of the front axle and the rear axle of the respective wheel tires are 0.40% for the two wheel tires at the front axle and 0.00% for the two wheel tires at the rear axle as shown in Table 19. Accordingly, when these changes are compared with the above-mentioned threshold of 0.3%, the threshold is smaller than the changes; therefore since it was judged as the reduced pressure at the two wheel tires at the front axle, the decompression of the two wheel tires were alarmed.

TABLE 19

| Change Rate | Left Side | Right Side |
| --- | --- | --- |
| Front Axle | 0.40% | 0.40% |
| Rear Axle | 0.00% | 0.00% |

Further, when the pressure of only the left two wheel tires at the same side was reduced by 40%, the judgment values of wheel positions at the front axle and the rear axle were respectively calculated as shown in Table 20.

TABLE 20

| Judgment Value | Left Side | Right Side |
| --- | --- | --- |
| Front Axle | 0.02008 | 0.02000 |
| Rear Axle | 0.01508 | 0.01500 |

The change rates from the basis values of the front axle and the rear axle of the respective wheel tires are 0.40% for the left front wheel tire, 0.53% for the rear wheel tires, and 0.00% for the two right wheel tires at the same side as shown in Table 21. Accordingly, when these changes are compared with the above-mentioned threshold of 0.3%, the threshold is smaller than the changes; therefore since it was judged as the reduced pressure at the two left wheel tires at the same side, the decompression of the two wheel tires were alarmed.

TABLE 21

| Change Rate | Left Side | Right Side |
| --- | --- | --- |
| Front Axle | 0.40% | 0.00% |
| Rear Axle | 0.53% | 0.00% |

Embodiment 2

Figure 3:
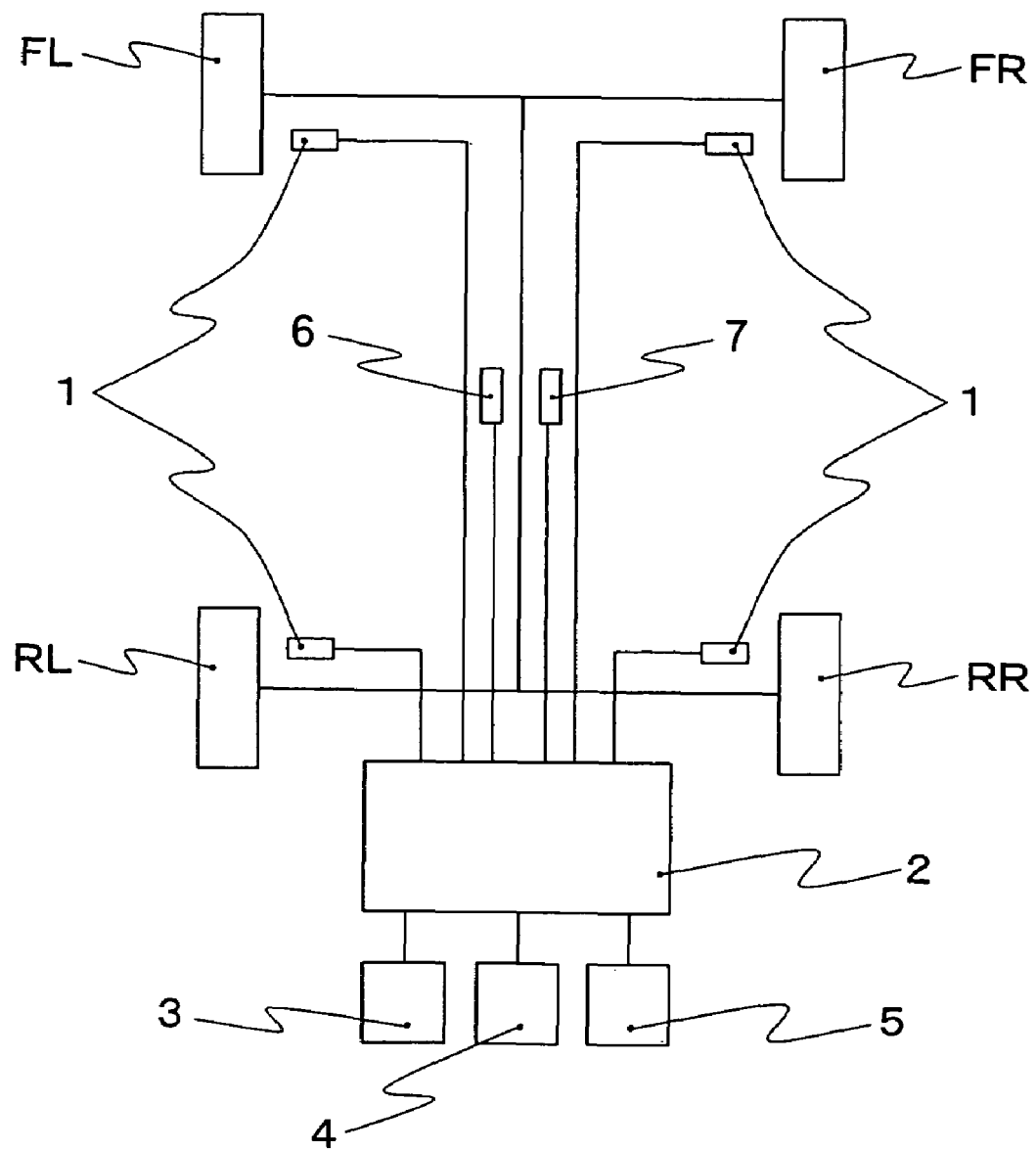
FIG. 3 is a block diagram showing the detection device for detecting decompression of tires related to Embodiment 2 of the present invention.
Figure 4:
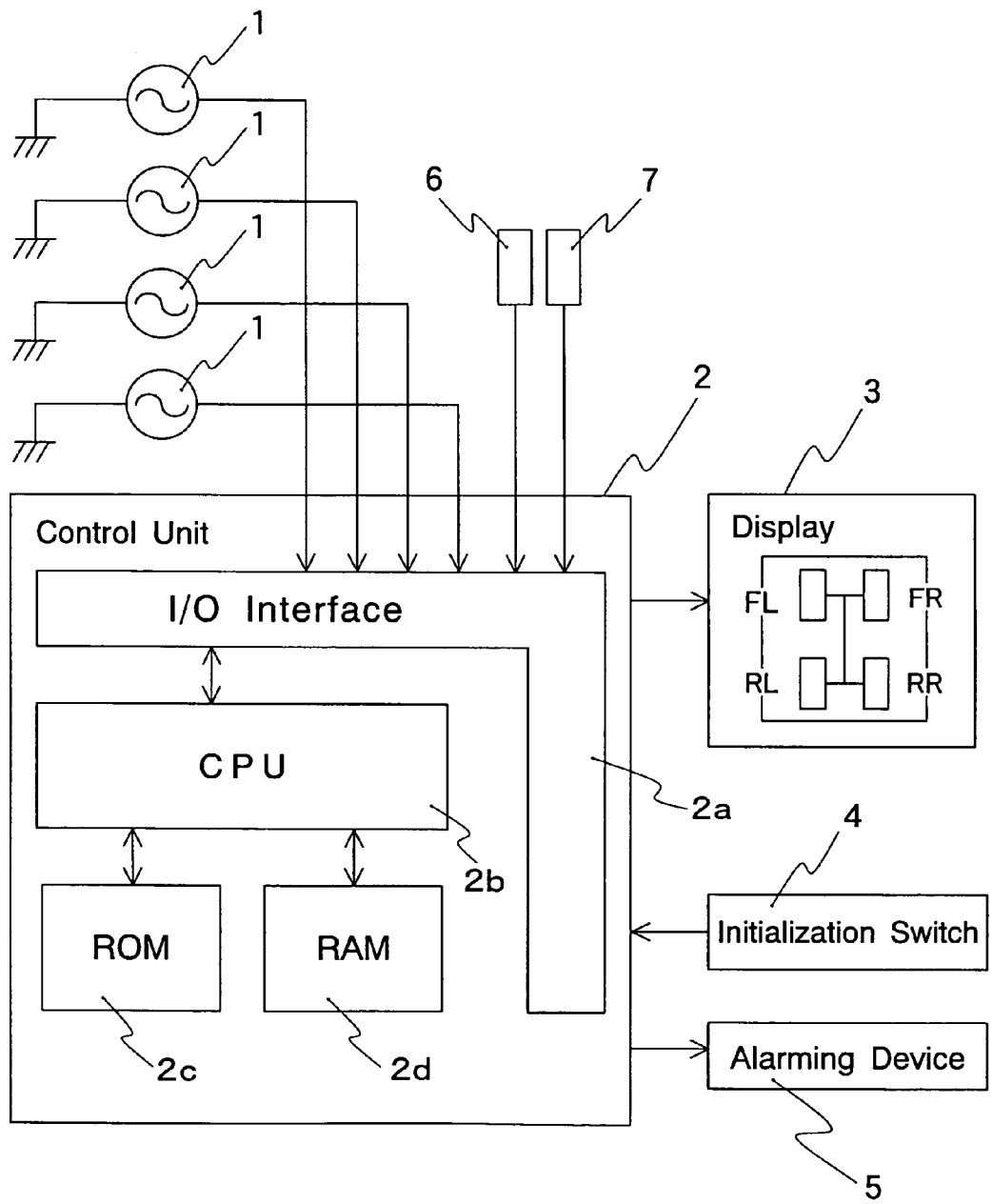
FIG. 4 is a block diagram showing the electric composition of the detection device for detecting decompression of tires of FIG. 3.

In Embodiment 2, a vehicle is equipped with a yaw rate-detection means 6 of outputting signals in accordance with the yaw rate of a vehicle and an lateral acceleration-detection means 7 of outputting signals in accordance with the lateral acceleration of a vehicle, in addition to the above-mentioned Embodiment 1 (FIG. 3). The output of the yaw rate-detection means 6 and the lateral acceleration-detection means 7 is provided to the control unit 2 (FIG. 4).

Embodiment 2 is composed of a wheel speed-detecting means 1, a speed against ground of a vehicle-calculating means of determining the speed against ground of the vehicle, a relational value-calculating means of determining a relational value between the above-mentioned wheel speed and the speed against ground of the above-mentioned vehicle, a correlation-calculating means of determining a correlation between the relational value and information value related to the vehicle, a comparison means of comparing the correlation with the above-mentioned correlation at the prescribed inner pressure, and a reduced pressure-judging means of judging decompression of tires based on the result of the comparison. Further, the program for judging the decompression of tires functionalizes the above-mentioned control unit 2 as a relational value-calculating means, a correlation-calculating means, a comparison means, and a reduced pressure-judging means.

The relational value between the above-mentioned wheel speed and the speed against ground of a vehicle can be, for example, a value (the wheel speed/the speed against ground of the vehicle) obtained by dividing the wheel speed by the speed against ground of the vehicle.

Further, factors related to a vehicle at running can be used for the above-mentioned information value related to a vehicle. For example, the sine of gradient of running road surface, the speed against ground of the vehicle, back-and-forth acceleration, lateral acceleration or a turning radius and the like can be used.

Consequently, the correlation between the relational value and the information value related to the vehicle is, for example, a relational equation which represents the relational value between the wheel speed and the speed against ground of a vehicle and the sine (sin θ) of the gradient of running road surface with the primary equation, a relational equation which represents the relational value between the wheel speed and the speed against ground of a vehicle and the speed against ground of a vehicle with the secondary equation, a relational equation which represents the relational value between the wheel speed and the speed against ground of a vehicle and the back-and-forth acceleration with the primary equation, a relational equation which represents the relational value between the wheel speed and the speed against ground of a vehicle and the lateral acceleration (load distribution change due to lateral force) with the primary equation, or a relational equation which represents the relational value between the wheel speed and the speed against ground of a vehicle and the turning radius with the primary equation.

In Embodiment 2, the above-mentioned control unit 2 memorizes preliminarily the above-mentioned correlation (relational equation) which was determined at the prescribed inner pressure, and the judgment of the reduced pressure of tires is carried out based on a result obtained by comparing it with the above-mentioned correlation (relational equation) at running (for example, the difference between values of both of sections is compared with a fixed threshold).

Further, the calculation method of the above-mentioned gradient can be obtained from gradient information according to the high level information of GPS, ITS and the like, and can be deduced from correlation between driving force and slip rate. In the present invention, it is not specifically limited, and can be appropriately selected.

For example, as the calculation method of the gradient, there can be used a method by which the gradient of road surface during running is calculated as follow from rotational acceleration obtained from the wheel speed of drive wheels of a vehicle during running and the back-and-forth acceleration by the back-and-forth acceleration-detecting means which was provided in the vehicle so as to be directed to the proceeding direction of the above-mentioned vehicle.

Firstly, the slip rate, S of the drive wheels of a vehicle during running is defined. Hereat, T is the rotational speed of the drive wheels, and V is the speed against ground of a vehicle.

$$S=(T-V)/T$$

Hereat, when the above-mentioned speed against ground of a vehicle and the value of the back-and-forth acceleration-detecting means are merely set as Va and Gval respectively, the relation which is indicated by the following equation is materialized for a vehicle running on the gradient, θ of road surface. Further, G is gravity acceleration.

$$Gval = G \times \sin\theta + Va$$

Hereat, when the rotational acceleration of the drive wheels is set as Ta, the above-mentioned speed against ground of a vehicle, Va is;

$$Va = (1-S) \times Ta$$

from the definition of the above-mentioned slip rate.
Thus, it is represented as;

$$Gval = G \times \sin\theta + (1-S) \times Ta$$

Accordingly, when the relation between Gval and Ta is plotted, linear relation in which the gradient is (1−S) and the section is G×sin θ is obtained; therefore the gradient of road surface is calculated from the value of the section (G×sin θ).

Further, there can be also used a method by which the gravity acceleration sensor which was provided on the vehicle to a proceeding direction, the wheel speed-detecting means and the pulse time interval of the wheel speed-detecting means are successively read in, an acceleration, a for the road surface of the vehicle is calculated based on its time fluctuation, the output value, A of the above-mentioned gravity acceleration sensor is read in synchronized with this, and the gradient, θ of road surface is calculated from said output value, A and the acceleration, a according to $\sin^{-1}(A-a)/G$ (G is gravity acceleration). The above-mentioned acceleration, a is calculated based on the time fluctuation of the average by averaging a plural number of the above-mentioned pulse time interval.

Further, as a method of measuring the gradient of road surface, a slant meter adopting a similar mechanical structure as a gyro compass can be also used.

Further, as a method of determining the gradient of road surface by detecting drive torque, there can be also used a method by which since the drive torque of a vehicle is balanced with the total of flat running resistance torque, acceleration resistance torque and gradient resistance torque, the drive torque of a vehicle, the flat running resistance torque and the acceleration resistance torque are determined from the relation that the drive torque of a vehicle=the flat running resistance torque+the acceleration resistance torque+the gradient resistance torque, and the gradient, θ of road surface is calculated from the following equation;

$$T\theta = W \times G \times \sin\theta \times Rt$$

Wherein Tθ: gradient resistance torque
W: weight of vehicle
G: gravity acceleration
Rt: Dynamic radius of tire Further, the above-mentioned lateral acceleration can be determined from the lateral acceleration-detection means 7 or the wheel speed. For example, with respect to the above-mentioned lateral acceleration of a vehicle, the speeds, V1 and V2 of coupled driving wheel tires, FL and FR are calculated in case of a FR car (front engine and rear drive), and then the turning radius, R is calculated according to the following equation.

$$R = \{(V2+V1)/(V2-V1)\} \times T_w/2$$

Wherein Tw is a distance between king pins (tread width) (m).

Then, the lateral acceleration of a vehicle can be calculated according to the following equation based on the turning radius, R of a vehicle.

$$\text{Lateral acceleration} = V^2/R$$

Further, the above-mentioned lateral acceleration can be also determined by multiplying the yaw rate from the yaw rate-detecting means 6 by the speed against ground of a vehicle.

The above-mentioned speed against ground of a vehicle is a speed against ground of a vehicle which can be determined by signals demodulated from received radio wave of GPS (Global Positioning System) and time, a speed against ground of a vehicle which can be determined by a sensor buried in road surface and passing time, and the like. For example, the speed against ground of a vehicle can be grasped by ITS (Intelligent Transport Systems: High grade road transport systems). Further, ITS is a transport system at multi media age which unites a system by which automobile cars are intelligent such as a car navigation system, with a system by which roads are intelligent such as a wide area transport control system. At present, respective ministries and carbuncles are under construction of ITS in cooperation. Alternatively, it can be determined by AHS (Automated Highway System: Automatic driving road system) and the like. AHS is a system which supports safe running by carrying out dangerous alarm and driving supplement in cooperation of roads with automobile cars.

When the above-mentioned GPS is used, it is required to provide a vehicle position-detecting means such as a transmitter and a receiver and a car navigation unit which used, for example, GPS antenna.

Then, the invention is illustrated based on Examples, but the invention is not limited only to these Examples.

EXAMPLE 5

A FF vehicle (front engine and front drive) mounting tires with the prescribed inner pressure was prepared. It mounted the detection device for detecting decompression of tires in which the program for judging reduced pressure related to Embodiment 2 was programmed.

Figure 5:
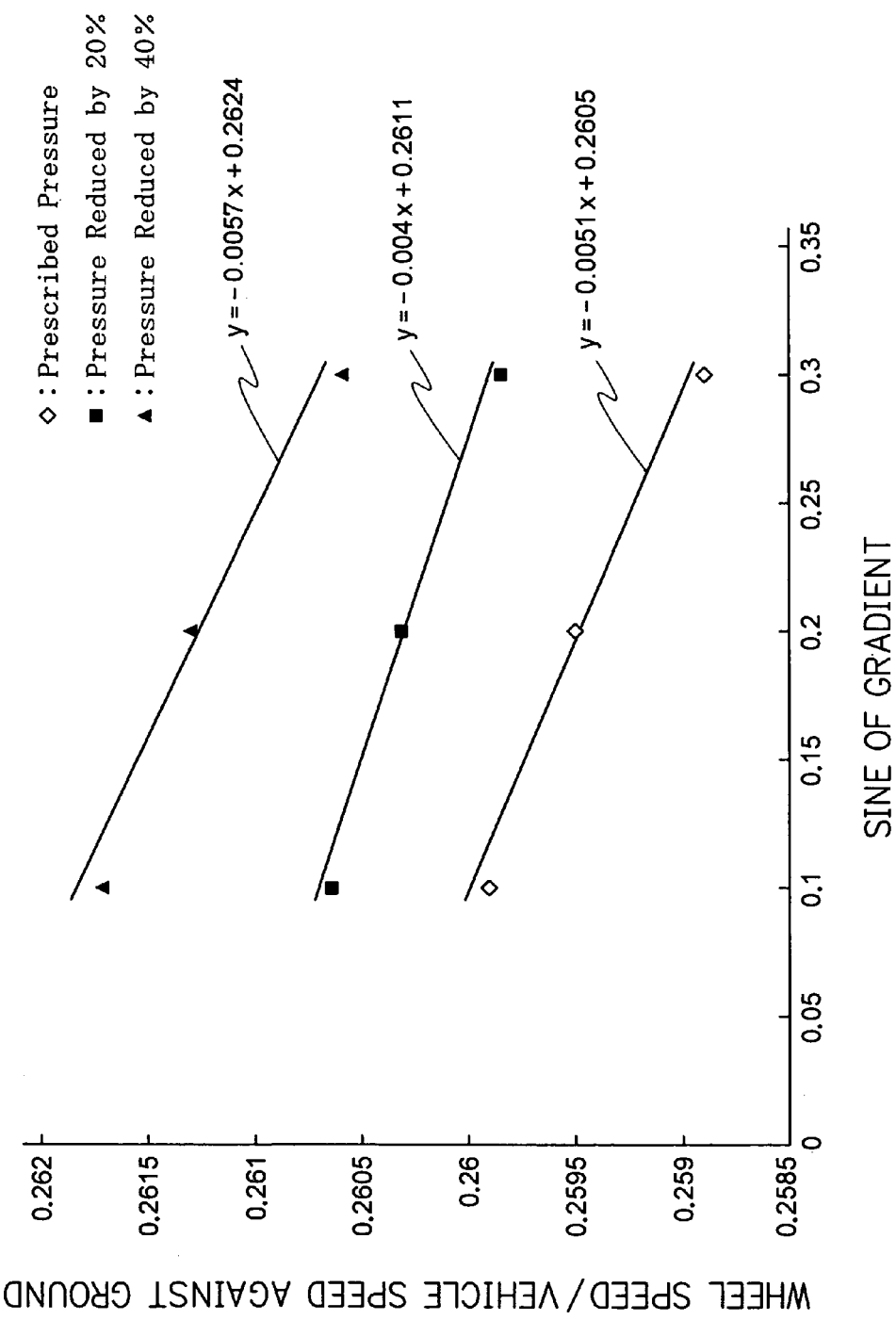
FIG. 5 is a diagram showing a relational equation represented by the primary equation of the relational value between the speeds of wheels and the speed against ground of a vehicle with the sine of gradient.

In the present Example, a relational equation which represents the relational value between the wheel speed and the speed against ground of a vehicle and the sine of gradient with the primary equation was determined using the sine of the gradient of running road surface as the information value related to a vehicle. The result is shown in FIG. 5.

The relational equation at the prescribed inner pressure was $y=-0.0051x+0.2605.$ Wherein y: wheel speed/speed against ground of a vehicle
x: sine of gradient Similarly, the relational equations were respectively determined by running tests in condition in which pressure was reduced by 20% and 40% than the prescribed pressure.

Then, the y-sections (the value of wheel speed/speed against ground of a vehicle when gradient (angle)=0 is assumed) of these relational equations are compared. Firstly, the values of the y-section are 0.2611 and 0.2624 from the relational equations in condition in which pressure was reduced by 20% and 40% than the prescribed pressure, and the differences from the prescribed pressure condition are 0.0006 and 0.0019. The differences are respectively equivalent to change rates of 0.2% and 0.7%. Since it is grasped from FIG. 5 that these change rates undergo at about same level irrespective of gradient, it is indicated that there is no problem even if the relational equations are typically compared with the y-sections.

Accordingly, decompression of tires can be judged by comparing the correlations (relational equations) at the prescribed inner pressure and at running.

EXAMPLE 6

A FF vehicle (front engine and front drive) mounting tires with prescribed inner pressure was prepared. It mounted the detection device for detecting decompression of tires in which the program for judging reduced pressure related to Embodiment 2 was programmed.

Figure 6:
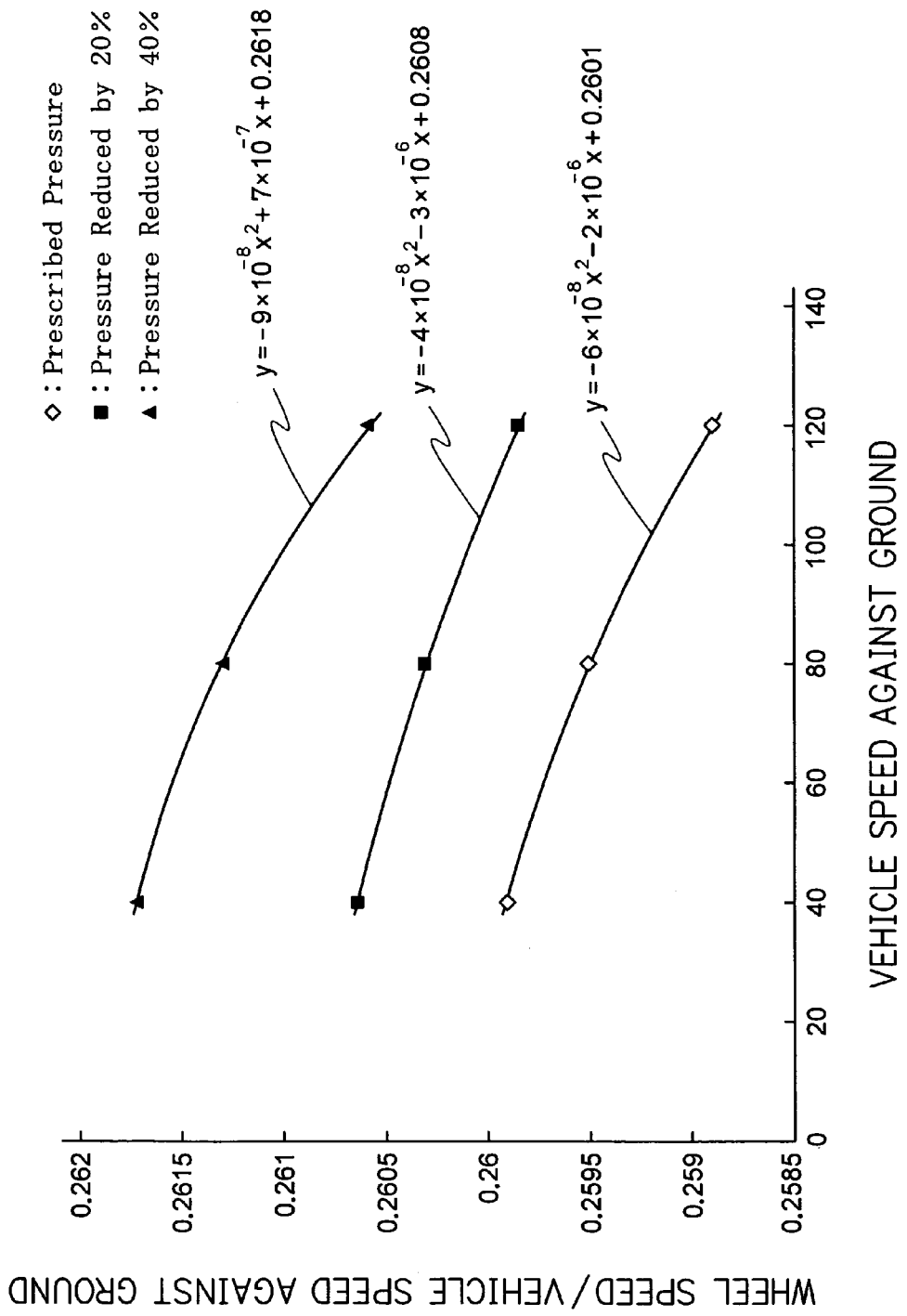
FIG. 6 is a diagram showing a relational equation represented by the secondary equation of the relational value between the speeds of wheels and the speed against ground of a vehicle with the speed against ground of a vehicle.

In the present Example, a relational equation which represents the relational value between the wheel speed and the speed against ground of a vehicle and the speed against ground of a vehicle with the secondary equation was determined using the speed against ground of a vehicle as the information value related to a vehicle. The result is shown in Table 22 and FIG. 6.

TABLE 22

|  | Vehicle Speed against Ground (km/h) | Wheel Speed/Vehicle Speed against Ground |
|---|---|---|
| Prescribed Inner Pressure | 40 | 0.25991242 |
|  | 80 | 0.259507308 |
|  | 120 | 0.25889553 |
| Decompression by 20% | 40 | 0.260642576 |
|  | 80 | 0.260309848 |
|  | 120 | 0.259848173 |
| Decompression by 40% | 40 | 0.261726183 |
|  | 80 | 0.261302966 |
|  | 120 | 0.260578218 |

The relational equation at the prescribed inner pressure was $y=-6\times10^{-8}x^2-2\times10^{-6}x+0.2601.$ Wherein y: wheel speed/speed against ground of a vehicle
x: speed against ground of a vehicle Similarly, the relational equations were respectively determined by running tests in condition in which pressure was reduced by 20% and 40% than the prescribed pressure.

Then, the y-sections (the value of wheel speed/speed against ground of a vehicle when no centrifugal force (speed against ground of a vehicle=0) is assumed) of these relational equations are compared. Firstly, the values of the y-section are 0.2608 and 0.2618 from the relational equations in condition in which pressure was reduced by 20% and 40% than the prescribed pressure, and the differences from the prescribed pressure condition are 0.0007 and 0.0019. The differences are respectively equivalent to change rates of 0.27% and 0.7%. Since it is grasped from FIG. 6 that these change rates undergo at about same level irrespective of the speed against ground of a vehicle, it is indicated that there is no problem even if the relational equations are typically compared with the y-sections.

Accordingly, decompression of tires can be judged by comparing the correlations (relational equations) at the prescribed inner pressure and at running.

EXAMPLE 7

A FF vehicle (front engine and front drive) mounting tires with prescribed inner pressure was prepared. It mounted the detection device for detecting decompression of tires in which the program for judging reduced pressure related to Embodiment 2 was programmed.

In the present Example, a relational equation which represents the relational value between the wheel speed and the speed against ground of a vehicle and the back-and-forth acceleration with the primary equation was determined using the back-and-forth acceleration as the information value related to a vehicle. The same relational equation as FIG. 5 was obtained by substituting the sine of gradient in the above-mentioned FIG. 5 with the back-and-forth acceleration.

The relational equation at the prescribed inner pressure was $y=-0.0051x+0.2605.$ Wherein y: wheel speed/speed against ground of a vehicle
x: back-and-forth acceleration Similarly, the relational equations were respectively determined by running tests in condition in which pressure was reduced by 20% and 40% than the prescribed pressure.

Then, the y-sections (the value of wheel speed/speed against ground of a vehicle when the back-and-forth acceleration=0 is assumed) of these relational equations are compared. Firstly, the values of the y-section are 0.2611 and 0.2624 from the relational equations in condition in which pressure was reduced by 20% and 40% than the prescribed pressure, and the differences from the prescribed pressure condition are 0.0006 and 0.0019. The differences are respectively equivalent to change rates of 0.2% and 0.7%. Since it is grasped from FIG. 5 that these change rates undergo at about same level irrespective of back-and-forth acceleration of, it is indicated that there is no problem even if the relational equations are typically compared with the y-sections.

Accordingly, decompression of tires can be judged by comparing the correlations (relational equations) at the prescribed inner pressure and at running.

EXAMPLE 8

A FF vehicle (front engine and front drive) mounting tires with prescribed inner pressure was prepared. It mounted the detection device for detecting decompression of tires in which the program for judging reduced pressure related to Embodiment 2 was programmed.

In the present Example, a relational equation which represents the relational value between the wheel speed and the speed against ground of a vehicle and the lateral acceleration with the primary equation was determined using the lateral acceleration (load distribution change due to lateral force) as the information value related to a vehicle. The same relational equation as FIG. 5 was obtained by substituting the sine of gradient in the above-mentioned FIG. 5 with the lateral acceleration.

The relational equation between the wheel speed at rotational outer side and the speed against ground of a vehicle at the prescribed inner pressure was $y=-0.0051x+0.2605.$ Wherein y: wheel speed/speed against ground of a vehicle
x: lateral acceleration Similarly, the relational equations were respectively determined by running tests in condition in which pressure was reduced by 20% and 40% than the prescribed pressure.

Then, the y-sections (the value of wheel speed/speed against ground of a vehicle when the lateral acceleration=0 (no centrifugal force) is assumed) of these relational equations are compared. Firstly, the values of the y-section are 0.2611 and 0.2624 from the relational equations in condition in which pressure was reduced by 20% and 40% than the prescribed pressure, and the differences from the prescribed pressure condition are 0.0006 and 0.0019. The differences are respectively equivalent to change rates of 0.2% and 0.7%. Since it is grasped from FIG. 5 that these change rates undergo at about same level irrespective of the lateral acceleration, it is indicated that there is no problem even if the relational equations are typically compared with the y-sections.

Accordingly, decompression of tires can be judged by comparing the correlations (relational equations) at the prescribed inner pressure and at running.

EXAMPLE 9

A FF vehicle (front engine and front drive) mounting tires with prescribed inner pressure was prepared. It mounted the detection device for detecting decompression of tires in which the program for judging reduced pressure related to Embodiment 2 was programmed.

Figure 7:
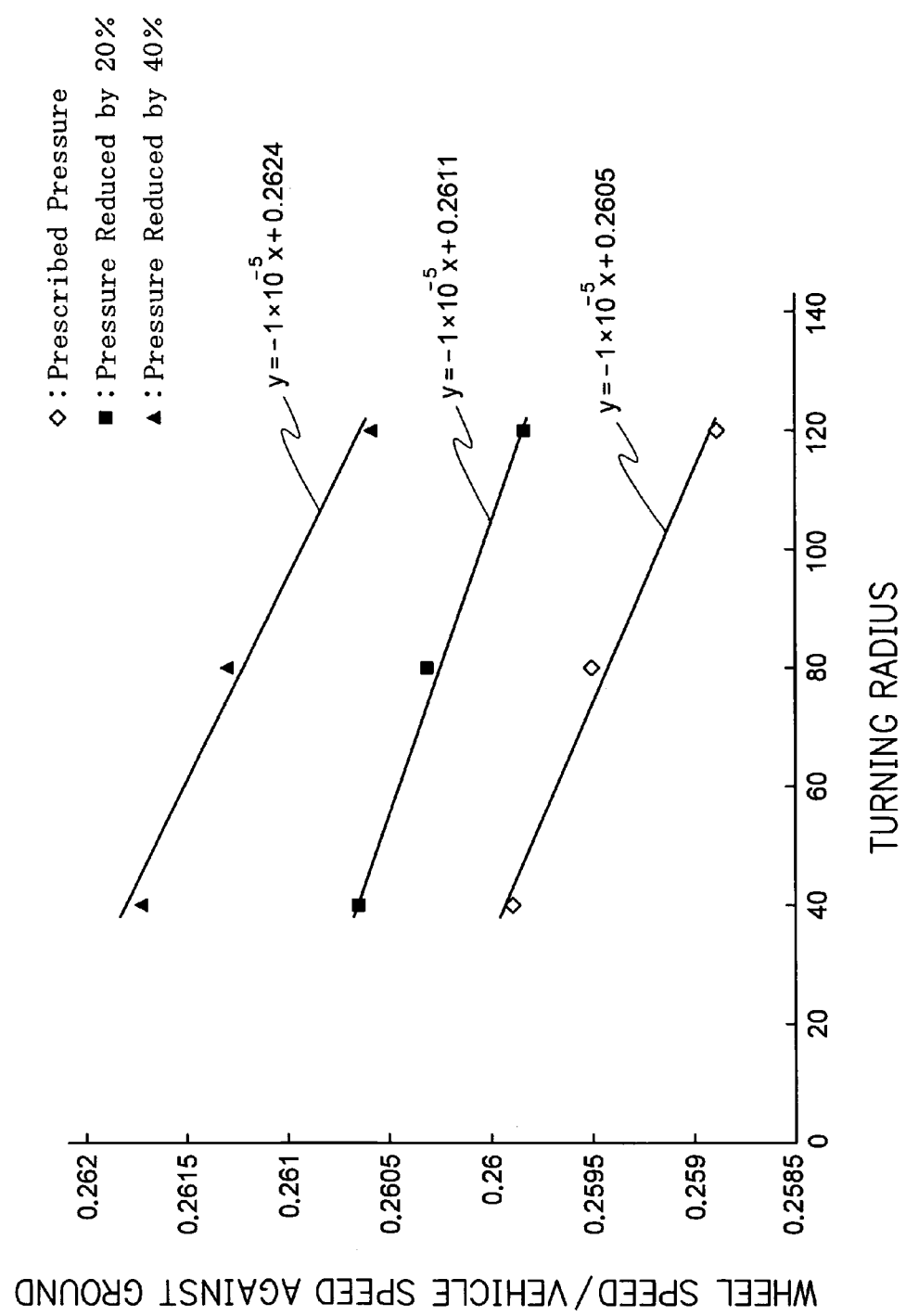
FIG. 7 is a diagram showing a relational equation represented by the primary equation of the relational value between the speeds of wheels and the speed against ground of a vehicle with a turning radius.

In the present Example, a relational equation which represents the relational value between the wheel speed and the speed against ground of a vehicle and turning radius with the primary equation was determined using the turning radius as the information value related to a vehicle. The result of running tests at rotational radii, R of 40 m, 80 m and 120 m is shown in FIG. 7.

The relational equation between the wheel speed at rotational outer side and the speed against ground of a vehicle at the prescribed inner pressure was $y=-1\times10^{-5}x+0.2605.$ Wherein y: wheel speed/speed against ground of a vehicle
x: turning radius Similarly, the relational equations were respectively determined by running tests in condition in which pressure was reduced by 20% and 40% than the prescribed pressure.

Then, the y-sections (the value of wheel speed/speed against ground of a vehicle when the lateral acceleration=0 (no centrifugal force) is assumed) of these relational equations are compared. Firstly, the values of the y-section are 0.2611 and 0.2624 from the relational equations in condition in which pressure was reduced by 20% and 40% than the prescribed pressure, and the differences from the prescribed pressure condition are 0.0006 and 0.0019. The differences are respectively equivalent to change rates of 0.2% and 0.7%. Since it is grasped from FIG. 7 that these change rates undergo at about same level irrespective of the size of the turning radius, it is indicated that there is no problem even if the relational equations are typically compared with the y-sections.

Accordingly, decompression of tires can be judged by comparing the correlations (relational equations) at the prescribed inner pressure and at running.

In Embodiment 2, after correlation between the relational value between the wheel speed and the speed against ground of a vehicle and the information value related to a vehicle was determined, decompression of tires is judged based on the result obtained by comparing said correlation with the above-mentioned correlation at the prescribed inner pressure. However, in the present invention, it is not limited to this, and after the correlation between the relational value of the wheel speed and the information value related to a vehicle was determined, decompression of tires can be also judged based on the result obtained by comparing said correlation with the above-mentioned correlation at the prescribed inner pressure.

The above-mentioned relational value of the wheel speed includes the relative value of the wheel speed on a pair of diagonals of a vehicle as shown in the following equation (9), the ratio of the wheel speed at the front axle to the wheel speed at the rear axle, (V1+V2)/(V3+V4), or difference, (V1+V2)−(V3+V4), or the ratio of the wheel speeds at the same side, for example, at left side to at right side, (V1+V3)/(V2+V4), or difference, (V1+V3)−(V2+V4).

$$\{(V1+V4)/2-(V2+V3)/2\}/\{(V1+V2+V3+V4)/4\} \quad (9)$$

Wherein V1 to V4 are the wheel speeds of a front left tire, a front right tire, a rear left tire and a rear right tire, respectively.

When above-mentioned relational value of the wheel speed is used, the above-mentioned control unit 2 is functionalized as a relational value-calculating means, a correlation-calculating means, a comparison means, and a reduced pressure-judging means.

According to the present invention, since the simultaneous (same rate) decompression of a plural number of wheels (left wheel tires, right wheel tires, wheel tires at a diagonal position, four wheel tires and the like) as well as the reduced pressure of one wheel tire can be detected, a region of judging decompression of tires can be broadened and the accuracy of reduced pressure judgment can be improved.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for detecting decompression of tires based on rotational speeds of wheels mounted on a vehicle, comprising the steps of:
   detecting a rotational speed of each of said wheels;
   determining a ground speed of said vehicle;
   calculating (1) speed information obtained from an average wheel speed of a front left wheel and a rear left wheel and (2) speed information obtained from an average speed of a front right wheel and a rear right wheel, from the rotational speeds of said wheels;
   memorizing the rotational speed of each of the wheels and the speed informations;
   calculating (1) a judgment value for the left side wheels by comparing the speed information obtained from the average wheel speed of the front left wheel and the rear left wheel with the ground speed of the vehicle and (2) a judgment value for the right side wheels by comparing the speed information obtained from the average wheel speed of the front right wheel and the rear right wheel with the ground speed of the vehicle;
   comparing the judgment value for the left side wheels with a basis value for the left side wheels obtained by comparing a speed information obtained from an average speed of the front left wheel and the rear left wheel with the ground speed of said vehicle at prescribed inner pressure to obtain a comparison value for the left side wheels;
   comparing the judgment value for the right side wheels with a basis value for the right side wheels obtained by comparing a speed information obtained from an average speed of the front right wheel and the rear right wheel with the ground speed of said vehicle at prescribed inner pressure to obtain a comparison value for the right side wheels; and
   judging decompression of tires by comparing the comparison values with a fixed threshold.

2. The method for detecting decompression of tires of claim 1, wherein the ground speed of said vehicle is determined by signals demodulated from received GPS radio waves and time.

3. A detection device for detecting decompression of tires based on rotational speeds of wheels mounted on a vehicle, comprising:
   a wheel rotational speed-detecting means for detecting a rotational speed of each of said wheels;
   a ground speed calculating means for determining a ground speed of the vehicle;
   a speed information-calculating means for calculating (1) speed information obtained from an average wheel speed of a front left wheel and a rear left wheel and (2) speed information obtained from an average speed of a front right wheel and a rear right wheel, from the rotational speeds of said wheels;
   a memory means for memorizing the rotational speed of each of the wheels and the speed information of said wheels;
   a judgment value-calculating means for calculating (1) a judgment value for the left side wheels by comparing the speed information obtained from the average wheel speed of the front left wheel and the rear left wheel with the ground speed of the vehicle and (2) a judgment value for the right side wheels by comparing the speed information obtained from the average wheel speed of the front right wheel and the rear right wheel with the ground speed of the vehicle;
   a comparison means for comparing the judgment value for the left side wheels with a basis value for the left side wheels obtained by comparing a speed information obtained from an average speed of the front left wheel and the rear left wheel with the ground speed of the vehicle at prescribed inner pressure to obtain a comparison value for the left side wheels;
   a comparison means for comparing the judgment value for the right side wheels with a basis value for the right side wheels obtained by comparing a speed information obtained from an average speed of the front right wheel and the rear right wheel with the ground speed of said vehicle at prescribed inner pressure to obtain a comparison value for the right side wheels; and
   a reduced pressure-judging means for judging decompression of tires by comparing the comparison values with a fixed threshold.

4. The detection device for detecting decompression of tires of claim 3, wherein the ground speed of said vehicle is determined by signals demodulated from received GPS radio waves and time.

5. A computer-readable medium storing a program for judging decompression of tires based on rotational speeds of wheels mounted on a vehicle, the program comprising:
   a speed information-calculating means for calculating (1) speed information obtained from an average wheel speed of a front left wheel and a rear left wheel and (2) speed information obtained from an average speed of a front right wheel and a rear right wheel, from the rotational speeds of said wheels;
   a memory means for memorizing the rotational speed of each of the wheels and the speed information of said wheels;
   a judgment value-calculating means for calculating (1) a judgment value for the left side wheels by comparing the speed information obtained from the average wheel speed of the front left wheel and the rear left wheel with a ground speed of the vehicle and (2) a judgment value for the right side wheels by comparing the speed information obtained from the average wheel speed of the front right wheel and the rear right wheel with the ground speed of the vehicle;
   a comparison means for comparing the judgment value for the left side wheels with a basis value for the left side wheels obtained by comparing a speed information obtained from an average speed of the front left wheel and the rear left wheel with the ground speed of the vehicle at prescribed inner pressure to obtain a comparison value for the left side wheels;
   a comparison means for comparing the judgment value for the right side wheels with a basis value for the right side wheels obtained by comparing a speed information obtained from an average speed of the front right wheel and the rear right wheel with the ground speed of said vehicle at prescribed inner pressure to obtain a comparison value for the right side wheels; and a reduced pressure-judging means for judging decompression of tires by comparing the comparison values with a fixed threshold.

6. A method for detecting decompression of tires based on rotational speeds of wheels mounted on a vehicle, comprising the steps of:

detecting a rotational speed of each of said wheels;

determining a ground speed of said vehicle;

calculating (1) speed information obtained from an average wheel speed of a front left wheel and a front right wheel and (2) speed information obtained from an average speed of a rear left wheel and a rear right wheel, from the rotational speeds of said wheels;

memorizing the rotational speed of each of the wheels and the speed informations;

calculating (1) a judgment value for wheels of a front axle by comparing the speed information obtained from the average wheel speed of the front left wheel and the front right wheel with the ground speed of the vehicle and (2) a judgment value for wheels of a rear axle by comparing the speed information obtained from the average wheel speed of the rear left wheel and the rear right wheel with the ground speed of the vehicle;

comparing the judgment value for wheels of the front axle with a basis value for wheels of the front axle obtained by comparing a speed information obtained from an average speed of the front left wheel and the front right wheel with the ground speed of said vehicle at prescribed inner pressure to obtain a comparison value for wheels of the front axle;

comparing the judgment value for wheels of the rear axle with a basis value for wheels of the rear axle obtained by comparing a speed information obtained from an average speed of the rear left wheel and the rear right wheel with the ground speed of said vehicle at prescribed inner pressure to obtain a comparison value for wheels of the front axle; and judging decompression of tires by comparing the comparison values with a fixed threshold.

7. The method for detecting decompression of tires of claim 6, wherein the ground speed of said vehicle is determined by signals demodulated from received GPS radio waves and time.

8. A detection device for detecting decompression of tires based on rotational speeds of wheels mounted on a vehicle, comprising:

a wheel rotational speed-detecting means for detecting a rotational speed of each of said wheels;

a ground speed calculating means for determining a ground speed of the vehicle;

a speed information-calculating means for calculating (1) speed information obtained from an average wheel speed of a front left wheel and a front right wheel and (2) speed information obtained from an average speed of a rear left wheel and a rear right wheel, from the rotational speeds of said wheels;

a memory means for memorizing the rotational speed of each of the wheels and the speed informations;

a judgment value-calculating means for calculating (1) a judgment value for wheels of a front axle by comparing the speed information obtained from the average wheel speed of the front left wheel and the front right wheel with the ground speed of the vehicle and (2) a judgment value for wheels of a rear axle by comparing the speed information obtained from the average wheel speed of the rear left wheel and the rear right wheel with the ground speed of the vehicle;

a comparison means for comparing the judgment value for wheels of the front axle with a basis value for wheels of the front axle obtained by comparing a speed information obtained from an average speed of the front left wheel and the front right wheel with the ground speed of said vehicle at prescribed inner pressure to obtain a comparison value for wheels of the front axle;

a comparison means for comparing the judgment value for wheels of the rear axle with a basis value for wheels of the rear axle obtained by comparing a speed information obtained from an average speed of the rear left wheel and the rear right wheel with the ground speed of said vehicle at prescribed inner pressure to obtain a comparison value for wheels of the front axle; and a reduced pressure-judging means for judging decompression of tires by comparing the comparison values with a fixed threshold.

9. The detection device for detecting decompression of tires of claim 8, wherein the ground speed of said vehicle is determined by signals demodulated from received GPS radio waves and time.

10. A computer-readable medium storing a program for judging decompression of tires based on the rotational speeds of wheels mounted on a vehicle, the program comprising:

a speed information-calculating means for calculating (1) speed information obtained from an average wheel speed of a front left wheel and a front right wheel and (2) speed information obtained from an average speed of a rear left wheel and a rear right wheel, from the rotational speeds of said wheels;

a memory means for memorizing the rotational speed of each of the wheels and the speed informations of said wheels;

a judgment value-calculating means for calculating (1) a judgment value for wheels of a front axle by comparing the speed information obtained from the average wheel speed of the front left wheel and the front right wheel with a ground speed of the vehicle and (2) a judgment value for wheels of a rear axle by comparing the speed information obtained from the average wheel speed of the rear left wheel and the rear right wheel with the ground speed of the vehicle;

a comparison means for comparing the judgment value for wheels of the front axle with a basis value for wheels of the front axle obtained by comparing a speed information obtained from an average speed of the front left wheel and the front right wheel with the ground speed of said vehicle at prescribed inner pressure to obtain a comparison value for wheels of the front axle;

a comparison means for comparing the judgment value for wheels of the rear axle with a basis value for wheels of the rear axle obtained by comparing a speed information obtained from an average speed of the rear left wheel and the rear right wheel with the ground speed of said vehicle at prescribed inner pressure to obtain a comparison value for wheels of the front axle; and a reduced pressure-judging means for judging decompression of tires by comparing the comparison values with a fixed threshold.

* * * * *